United States Patent

[11] 3,548,977

| [72] | Inventor | Frank S. Morgan |
| | | 5405 N. 27th Road, Arlington, Va. 22207 |
| [21] | Appl. No. | 593,016 |
| [22] | Filed | Nov. 9, 1966 |
| [45] | Patented | Dec. 22, 1970 |

[54] SHOCK ABSORBERS
6 Claims, 9 Drawing Figs.

[52] U.S. Cl. .................................................. 188/88, 188/96
[51] Int. Cl. .................................................. F16f 9/46
[50] Field of Search ........................................... 188/88.502, 96.2, 96.21

[56] References Cited
UNITED STATES PATENTS
967,285   8/1910   Wilson ........................ 188/88(.502)

FOREIGN PATENTS
1,249,681  11/1960  France ........................ 188/88(.502)
1,295,114   4/1962  France ........................ 188/96(.21)
   25,918   9/1910  Great Britain ................ 188/96(.21)

Primary Examiner—George E. A. Halvosa

ABSTRACT: An infinitely variable fluid shock absorber having remote controls operable manually or automatically in response to changes in static pressure of the variable spring system, speed-indicating signalling device or actuation of the hydraulic braking system. A shock absorber piston assembly method which peripherally secures the flexible disc valves, rotating adjustment valves, disc travel guards, seal seat and piston rod together in one crimping operation.

PATENTED DEC 22 1970　　　　　　　　　　　　　　　　　3,548,977

[ELECTED SPECIES]

INVENTOR
Frank S. Morgan

SHOCK ABSORBERS

The present invention relates to remote control variable fluid shock absorber with speed interval damping, vehicle dive arrestor and method of piston construction and assembly.

Various systems are known for adjusting fluid shock absorbers to selectively vary the cross section of flow between the damping chambers. Some systems provide for limited manual adjustment by removal of the shock absorber from its mountings while the vehicle is at rest. Others permit manual stage adjustment, by means of slide valves, without dismantling but while the vehicle is at rest. These systems lack flexibility in that they can only be adjusted while the vehicle is stopped and require jacking means and often special tools to accomplish the time-consuming adjustment of each shock absorber individually. A further limitation of known systems is the inability of the operator to determine the effect of each adjustment until he has resumed operation of the vehicle. Furthermore, the operator is unable with present systems to select variations in settings upon being confronted with changing road, load or speed conditions without stopping the vehicle and laboriously adjusting each shock absorber according to his best guess as to which of the limited settings might come closest to meeting the new conditions.

In known automatically adjustable systems, such as my prior U.S. Pat. No. 3,246,905 of Apr. 19, 1966 where I describe automatic adjustment of damping resistance in direct response to changes in static loading of the vehicle and in another recently developed system which relates the adjustment of the damping effect to the speed of the vehicle by using the variable control pressure of the automatic transmission, the driver is forced to accept as a compromise a single criterion, i.e. load or speed, for determining the setting of his vehicle's shock absorbers. Experience has proven that one criterion automatic adjustment of shock absorber damping resistance does not provide sufficient flexibility to meet the variety of conditions under which vehicles are operated today. In addition to the problems attendant upon changing loads, roads and speeds there are still further damping problems found in certain vehicles, such as high-speed rail vehicles of elongated construction, in that the motors of such vehicles tend to develop harmful harmonic vibration frequencies at certain speed which require increased damping only at those speeds and a return to normal damping at other speeds.

One of the objects of this invention is to provide a remotely controlled hydraulic shock absorber which can be infinitely adjusted by the driver in both the compression and rebound stroke settings while the vehicle is in motion so as to enable the driver to gauge the results of each adjustment as it is being made.

Another object of this invention is to provide a remotely controlled hydraulic shock absorber which can be infinitely varied in either the compression or rebound stroke, either independently of each other or simultaneously while maintaining any preselected flow-ratio setting between compression and rebound strokes.

An additional object of this invention is to provide automatic remote control means for increasing the damping effect produced by a shock absorber during any preselected speed interval, or intervals, and decreasing said effect to the preexisting damping conditions when the selected interval has passed.

Another object of this invention is to provide a shock absorber system which is automatically responsive to changes in static loading of the vehicle and which can be automatically adjusted to achieve increased damping during a preselected speed interval, or intervals, and to achieve decreased damping when the preselected interval has passed.

Another object of this invention is to provide a shock absorber system which is automatically responsive to changes in static loading of the vehicle and which can be automatically adjusted to increase the damping effect in all shock absorbers simultaneously in both compression and rebound strokes by activation of the hydraulic braking system of the vehicle thus preventing the diving tendency of a moving vehicle upon sudden braking.

Another object of this invention is to provide a novel method of piston construction and assembly which offers substantial reductions in cost of manufacture.

A still further object of this invention is to disclose a novel structure in disc valve assemblies for shock absorber pistons whereby peripherally secured radially segmented valve flaps provide segmented cylindrical flexing to achieve quicker response and longer valve life.

Further objects and advantages will appear from the following specifications when read in conjunction with the accompanying drawings in which certain preferred embodiments of the invention are illustrated by way of example.

Figures 1, 2, 3, 4, 5, 6, 7, 8, 9:
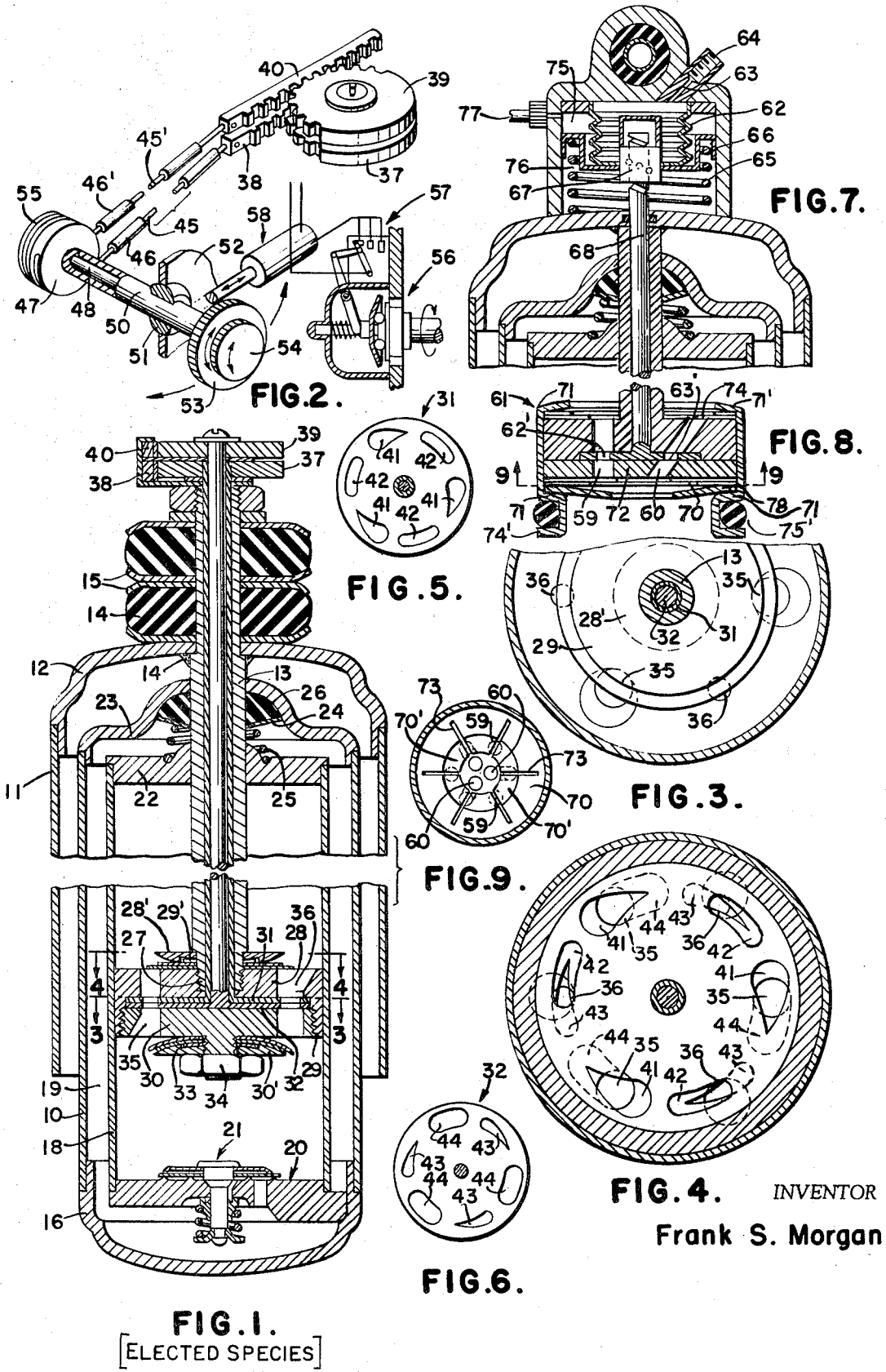
FIG. 1 is a fragmentary longitudinal section view of a preferred version of a remotely adjustable shock absorber.
FIG. 2 is a three-dimensional, partially fragmented view of the control means for the remotely adjustable shock absorber shown in FIG. 1.
FIG. 3 is a detailed plan view of the upper portion of the piston block itself taken at line 4—4 in FIG. 1.
FIG. 4 is a detailed plan view of the disc valves and piston ports taken at line 3—3 in FIG. 1.
FIG. 5 is a top plan view of upper rotary disc valve 31.
FIG. 6 is a top plan view of lower rotary disc valve 32.
FIG. 7 is a fragmentary longitudinal exploded view of a modification of my invention showing automatically adjustable, static air spring pressure responsive shock absorber with speed interval damping valve means.
FIG. 8 is a cross-sectional view of a preferred version of the piston block with peripheral edge-supported disc valve assemblies.
FIG. 9 is a detailed bottom plan view of the lower portion of the piston block in FIG. 8 taken at line 9—9.

Reference now being had to the details of the drawings by numeral. In FIG. 1, a cylindrical outer casing 10 has relative telescoping movement within a cylindrical guard or shield 11 that is spaced radially outwardly from the casing 10. The upper end of guard 11 is closed by an inverted cup-shaped closure or cap member 12 shown as secured thereto by welding or other suitable means. The cap member 12 is rigidly connected to hollow piston rod 13 by welding as shown at 14 or other suitable means. Hollow piston rod 13 extends through a hole in cap member 12 to form a bayonet type mounting on which rubber-mounting grommets 14, separated by metal guard washers 15, are slidably mounted for connection in a conventional manner with a frame part of the vehicle. The lower end of the casing 10 is closed by a cup-shaped closure member 16. The closure member 16 preferably is connected to the casing 10 by welding or other suitable method.

The pressure of working cylinder 18 is disposed within the casing 10 in spaced concentric relationship therewith so that the space defined by the casing 10, cylinder 18, closure member 16 and closure member 23 for the upper end of the casing and cylinder, constitutes a reservoir 19 for the oil in the shock absorber. The lower end of the working cylinder 18 is connected to an inverted cup-shaped closure and valve cage member 20 which is also connected to the closure member 16. The member 20 mounts replenishing and impact valve assembly 21, the purpose of which is well understood in the art. It will be understood that during the impact or downward stroke of the piston of the shock absorber, oil will flow from the working cylinder 18 through the replenishing and impact valve assembly 21 when a predetermined oil pressure occurs and thence through passages between the member 20 and the closure member 16 and into the reservoir 19. It will also be understood that during the rebound or upward stroke of the piston, that valve assembly 21 unseats when a predetermined oil pressure occurs and oil flows from the reservoir 19 through valve 21 and into the working cylinder 18 below the upwardly moving piston.

The upper or high pressure end of the working cylinder 18 is closed by a plug member 22 having a centrally disposed opening therein and through which opening the hollow piston rod 13 slidably extends. The upper end of the casing 10 is closed by a closure member 23 mounted in the casing and suitably secured thereto. Between closure members 23 and plug member 22 is a seating ring 24 having a central opening therein for seating coil spring 25 which holds under compression conical piston rod packing 26 through which hollow piston rod 13 extends and passes outwardly through closure member 23 by means of the central opening provided therein.

The construction thus far set forth in well known in the art and per se constitutes no part of the present invention.

The hollow piston rod 13 preferably has a male thread 27 at its attenuated lower portion for engaging with the threaded upper piston section 28. Adjacent to thread 27, hollow piston rod 13 has an annular shoulder for seating valve deformation guard 28' which limits the range of stress of flexible flap valve assembly 29'. Upper piston section 28 is provided with a threaded counterbore 29 adapted to receive the lower portion 30 of the two-part piston, the lower portion 30 being threaded at its periphery as indicated at 29. Upper portion 28 of the two-part piston has a recessed face within which disc valves 31 and 32 are coaxially rotatably mounted. The stem of disc valve 32 being mounted within the hollow stem of compression disc valve 31 as described above. Lower portion 30 of the two-part piston has an attenuated threaded lower extremity on which valve deformation guard 30' is slidably mounted to limit the range of stress of flexible flap valve assembly 33 and secured thereto by nut 34.

As shown in FIG. 5, compression disc valve 31 has a plurality of teardrop-shaped orifices 41 and an equal number of eliptical kidney bean-shaped orifices 42 arranged symmetrically with respect to the axis of the piston. Rebound disc valve 32, as shown in FIG. 6, has a matching number of teardrop-shaped orifices 43 as does disc valve 31 but of a smaller cross section than those of 31. Disc valve 32 also has an equal number of elliptical kidney bean-shaped orifices 44 but of a larger cross section than those of disc 31 and arranged symmetrically with respect to the axis of the piston. Upper and lower piston sections 28 and 30 have a plurality of longitudinally extending flow passageways 35 positioned to register with the teardrop-shaped orifices 41 of compression disc valve 31 and in registry with each of the kidney bean-shaped orifices 44 of rebound disc valve 32 as shown in FIG. 4. Upper piston section 28 and lower piston section 30 also have a plurality of longitudinally extending flow passages 36 positioned to register with the teardrop-shaped orifices 43 of rebound disc valve 32 and with kidney bean-shaped orifices 42 of compression disc valve 31.

Compression disc valve member 31 has an integral hollow stem rotatably mounted within hollow piston rod 13 and extending beyond the full length of said piston rod 13 where it is axially joined with pinion 37. Pinion 37 in turn engages with rack 38 which is flexibly connected with control pulley 47 through flexible cable 45 which is slidably mounted within cable guide 46. Control pulley 47 is rigidly mounted on hollow shaft 50 which is rotatably mounted in universal bearing 51 which is suitably mounted in the vehicle control panel 52. Control knob 53 is rigidly mounted on the opposite end of hollow control shaft 50 so as to establish universal bearing 51 as a fulcrum between control pulley 47 and control knob 53.

Rebound disc valve member 32 has an integral stem rotatably mounted within the hollow stem of compression disc valve member 31 and extending beyond the full length of said hollow stem where it is axially joined with pinion 39. Pinion 39 in turn engages with rack 40 which is flexibly connected with a control pulley 55 through flexible cable 45' which is slidably mounted within cable guide 46'. Control pulley 55 is rigidly mounted on control shaft 48 which is rotatably mounted within hollow shaft 50 and extends beyond the end of hollow shaft 50 where it is axially joined with control knob 54 thus forming a rigid connection between control pulley 55 and control knob 54 through control shaft 48.

To accomplish remote adjustment of any desired shock absorber the driver of the vehicle selects the pair of control knobs 53 and 54 on the instrument panel which correspond with the shock absorber to be adjusted. To increase the resistance of the selected shock absorber in the compression stroke, while the vehicle is in motion, the driver turns control knob 53 in a clockwise direction which rotates hollow shaft 50 and control pulley 47 in the same direction. Control pulley 47 in turn actuates cable 45 and rack 38 which causes pinion 37 and compression disc valve 31 to rotate in a counterclockwise direction which causes teardrop-shaped orifices 41 of disc valve 31 to gradually move out of registry with piston-flow passageways 35 so as to increase the resistance to movement of said piston in the compression stroke. Conversely, to decrease the resistance to movement of the piston in the compression stroke the driver turns control knob 53 in a counterclockwise direction which rotates hollow shaft 50 and control pulley 47 in the same direction. Control pulley 47 in turn actuates flexible cable 45 and rack 38 which causes pinion 37 and compression disc valve 31 to rotate in a clockwise direction which causes teardrop-shaped orifices 41 of disc valve 31 to gradually move into registry with piston flow passageways 35 so as to increase the cross section of flow through piston port passages 35 and thereby decreasing the resistance to movement of the piston in the compression stroke. Adjustment of compression disc valve 31 in the manner just described is accomplished independently of disc valve 32 and without affecting resistance to movement of the piston in the other direction or rebound stroke. Kidney bean-shaped orifices 42 of disc valve 31 and 44 of disc valve 32 are shaped so as to always be in full registry with piston ports 35 and 36 and accordingly do not restrict the amount of flow through piston ports 35 and 36 regardless of the setting of either compression valve 31 or rebound valve 32. To stiffen the resistance of the selected shock absorber in the rebound or extension stroke the driver similarly turns control knob 54 in a clockwise direction which in turn rotates shaft 48 and control pulley 55 in the same direction which actuates cable 45' and rack 50 which causes pinion 39 and rebound disc valve 32 to rotate in a counterclockwise direction moving teardrop-shaped orifices 43 of disc valve 32 out of registry with flow passages 35 so as to gradually diminish the cross section of flow through orifices 43 until the desired degree of increase in damping in the rebound stroke is achieved. Conversely, to decrease resistance to movement of the piston in the rebound stroke the driver turns control knob 54 in a counterclockwise direction which through pulley 55, cable 45', rack 40 and pinion 39 causes rebound disc valve 32 to rotate in a clockwise direction moving teardrop-shaped orifices 43 of disc valve 32 into registry with flow passageways 35 so as to gradually increase the cross section of flow through orifices 43 until the desired degree of decrease in damping in the rebound stroke is achieved. Adjustment of disc valve 32 in the manner described does not affect the adjustment of compression disc valve 31, each being capable of independent adjustment as desired.

However, should the driver of the vehicle desire to increase or decrease the damping effect in any selected shock absorber in both compression and rebound strokes simultaneously without changing the ratio of flow settings between the two strokes, he need only move control knob 53 horizontally to his right (facing the control panel) to accomplish a proportionate increase in damping in both strokes, or to his left to accomplish a proportionate decrease in damping in both strokes. The movement of control knob 53 in a horizontal arc to the driver's right results in control pulleys 47 and 55 being simultaneously actuated in a horizontal arc in the same plane but in the opposite direction with universal bearing 51 serving as a fulcrum or axis. Control pulleys 47 and 55 simultaneously actuate racks 38 and 40 through cables 45 and 45' which results in the rotation, to the same degree, of pinions 37 and 39 simultaneously in a counterclockwise direction and corresponding rotation in disc valves 31 and 32 to produce a simultaneous proportionate reduction in the cross section of flow through piston ports 35 and 36 and a resultant increase in resistance to movement of the shock absorber piston throughout compression and rebound strokes without disturbing the preexisting ratio of flow between compression and rebound flow settings. Conversely, movement of control knob 53 horizontally to the driver's left results in control pulleys 47 and 55 being forced in a horizontal arc in the same plane to the right with universal bearing 51 again serving as the fulcrum. Control pulleys 47 and 55 in turn simultaneously actuate racks 38 and 40 through cables 45 and 45' to produce the rotation of pinions 37 and 39 in a clockwise direction and correspondingly rotate disc valves 31 and 32 to achieve a simultaneous proportionate increase in the cross section of flow through piston ports 35 and 36 and a resultant decrease in resistance to movement of the shock absorber piston throughout compression and rebound movements while maintaining the same ratio of flow between compression and rebound flow settings. Because orifices 41 have larger design flow capacity than orifices 43 the simultaneous change in the same direction of both compression disc 31 and rebound disc 32 to an equal degree results in unequal but proportionate changes in their respective flow cross section. The preselected ratio between compression stroke resistance and rebound stroke resistance can thus be maintained while the overall strength or resistance of the shock absorber can be varied to meet changing load, road or speed conditions.

Again referring to FIG. 2, control knobs 53 and 54 can also be simultaneously adjusted to achieve a proportionate increase or decrease of damping effect by automatic means such as the wheel speed indicator controlled electric signal system, indicated generally at 57, which at preselected speed intervals actuates an electroservo push-pull motor shown generally at 58 which in turn actuates control knobs 53 and 54 through a suitable flexible connection (not shown) with control shaft 50 so as to produce increased or decreased damping during any preselected speed interval, (i.e. 25 through 30 m.p.h. When the selected interval has passed, the electroservomotor 58 automatically returns control knobs 53 and 54 to their original position. Compression control knob 53 and rebound control knob 54 can still be adjusted independently of the automatic control just described and independently of each other even when automatic control shaft 50 is linked to the speed-actuated control system.

FIG. 7 shows a modification of my invention disclosing automatically adjustable damping means responsive to changes in static loading of the vehicle, as described in my U.S. Pat. No. 3,246,905 of Apr. 19, 1966, combined with the speed interval responsive damping control system shown in FIG. 2, and particularly at arrow numerals 56, 57 and 58. The electroservomotor, however, instead of being connected to control shaft 50 is connected to a hydraulic piston (not shown) which in turn is connected with hydraulic line 77 of FIG. 7.

To accomplish the automatic simultaneous adjustment of damping resistance in both compression and rebound strokes in response to changes in static loading of the vehicle in combination with speed interval controlled damping, the sealed bellows 62, of FIG. 7, serves as a fluid motor actuated by the increase or decrease of pressure through needle orifice 63 from a pressure source 64, which is responsive to changes in static loading of the vehicle such as the pressure in a variable rate fluid spring of the type commonly used on passenger buses, trucks, trains and passenger vehicles. As the fluid pressure in flexible bellows 62 increases in response to change in static pressure of the spring system of the vehicle, coil spring 65, which normally counterbalances the design load pressure of the spring system, is depressed downwardly by slidably mounted piston 66 which is suitably joined and axially mounted with ball screw cage 67, or some other means for converting linear motion to rotary motion, the operation of which is well known to those familiar with the art. The linear downward movement of ball screw cage 67 causes disc valve 68 to rotate in a clockwise direction due to the fact that the integral stem of rotary disc valve 68 has screw threads at its free end to receive the ball bearings carried by ball screw cage 67.

Disc valve 68 has a plurality of teardrop-shaped orifices 62' and 63' relatively sized and positioned like orifices 41 and 43 of FIG. 4, and which are positioned to register with a like number of compression passages 59 and rebound passages 60. Said teardrop-shaped orifices have their tails, or narrow ends, pointed in a counterclockwise direction so that rotation of rotary disc valve 68 in a clockwise direction results in the gradual reduction in the cross section of flow through compression passages 59 and rebound passages 60 simultaneously. Conversely, when the fluid pressure in flexible bellows 62 decreases in response to a reduction in static pressure of the liquid spring system of the vehicle, coil spring 65 responds to the reduction in pressure forcing piston 66 and ball screw cage 67 upward causing disc valve 68 to be rotated in a counterclockwise direction which simultaneously produces an increase in the cross section of flow through compression passages 59 and rebound passages 60 and a resultant lessening of resistance to movement of the piston in both compression and rebound strokes. Spring 65 is normally counterbalanced only by the static pressure in bellows 62 which is determined by the static pressure in the variable spring system as described above. However, when additional fluid pressure is introduced in chamber 75 from an external pressure source, such as the speed interval responsive damping control system shown in FIG. 2, the pressure differential across movably sealed piston 66 created thereby causes spring 65 to be depressed producing increased damping effect in both compression and rebound strokes in proportion to the increased pressure introduced.

The structure disclosed in FIG. 7 also lends itself to the use of other secondary pressure sources to accomplish additional damping beyond that required to meet changes in static loading. Chamber 75 can also be connected to the hydraulic braking system of a vehicle, for example, so that upon actuation of the brake petal, or other brake actuating means, additional fluid pressure is introduced into chamber 75 to produced any desired degree of damping as described hereinabove. By sudden introduction of pressure into chamber 75 from the vehicle braking system the shock absorbers at each wheel can be suddenly adjusted to produce increased resistance to movement of the piston in either direction, which tends to prevent the diving effect on a sprung vehicle produced by sudden application of the vehicle braking system.

Referring to FIG. 8, each piston is equipped with one or more flexible disc valve assemblies 70 and 74 which are peripherally secured by crimping of piston sleeve bearing 61 inwardly toward the piston axis at an angle suitable to support deformation guards 71' and 71 which limit the range of stress of said flexible disc valve assemblies 70 and 74 thus reducing metal fatigue in these assemblies and prolonged flex life. Piston sleeve 61 is formed to provide a seat 74' for seal 75'. Disc valve assemblies 70 and 74 are comprised of a plurality of flexible metal discs, each having the same circumference but inner washer 70' having a smaller central aperture than outer washer 70. As shown in FIG. 9, each flexible washer is segmented by a plurality of symmetrically arranged radial expansion slots 73 each of which begins near the peripheral edge of the washer and extends inwardly toward the axis of the piston through the inner edge of each washer. The radial slots of washer 70 are designed to register with slots of washer 70' thus dividing each washer into a number of independently flexible flaps which register with corresponding flaps of each successive outer washer. Each successive outer washer serves as a backup spring for each adjacent inner washer as shown in FIG. 9. This structure reduces the possibility of fracturing of the discs and provides greater flexing life for each flap by providing expansion slots 73 at the points where the working fluid pressure causes the greatest stress. In addition, the cylindrical flexing resulting from the deformation of each flexible tongue 70' is distributed over a larger hinge area provided by peripherally supported discs. Disc valve assembly 70 is positioned so that an expansion slot 73 is centered over each of the longitudinally extending fluid passageways 59, each slot providing a small open flow passage when the disc valve assembly is in a closed position. This arrangement permits a limited volume of flow of working fluid, at the beginning of the compression stroke, to pass through the expansion slots thus creating a priming force to relieve the adhesion between tongue 70' and the flat surface of the lower half of piston block 72 caused by surface tension of the residue of working fluid between the two flat surfaces. Expansion slots 73 also assure a faster return of the flexed valve flaps to their seats on the piston surface due to the fact that one edge of each flap is assisted on its return movement by the suction created by the venturi effect of the working fluid passing through the constricted flow ports 59 and 60. Rapid return of the flexible disc tongues 70' is very important in order to avoid the transmission of small impacts at high frequencies such as those encountered when the vehicle is traversing a cobblestone pavement or the like.

Although preferred embodiments of the invention have been illustrated and described herein, it will be understood that the invention is susceptible of various modifications and adaptions.

I claim:

1. In a piston for cylinders of double-acting shock absorbers, said piston comprising:
   a. one or more ported sections;
   b. one section having a hollow integral stem and a centrally apertured recessed face opposite the free end of said stem;
   c. one or more port flow varying means received within said recessed face; and
   d. means for the remote adjustment of said port flow varying means whereby said port flow varying means may be adjusted in a manner whereby the ratio of flow between compression and rebound strokes can be infinitely varied and any selected ratio maintained throughout the stroke while the total cross section of flow in both compression and rebound strokes can be simultaneously and infinitely varied.

2. The shock absorber piston as described in claim 1 in which the means for remote adjustment of said port flow varying means may be manually adjusted independently of each other in a manner whereby resistance to the movement of said piston throughout the stroke in one direction may be varied without affecting resistance to movement of said piston throughout the stroke in the other direction.

3. The shock absorber piston as described in claim 2 in which the means for remote adjustment of said port flow varying means may be manually adjusted as described therein while the shock absorber is in operation.

4. The shock absorber piston as described in claim 1 in which the means for remote adjustment of said port flow varying means may be adjusted simultaneously as described therein while the shock absorber is in operation.

5. The shock absorber piston as described in claim 4 wherein said means for remote adjustment of said port flow varying means are two coaxially mounted gear and rack assemblies, the first assembly being operatively mounted on the projecting hollow stem of a first flow control disc valve and operatively linked to the outer of two concentrically and rotatably mounted control wheel and knob assemblies which are pivotally mounted in a universal bearing, the second gear and rack assembly being operatively mounted on the projecting stem of a second flow control disc valve and operatively linked to the inner of said two concentrically and rotatably mounted control wheel and knob assemblies, said means for adjusting said first and second flow control disc valves being adapted to adjustment simultaneously while the shock absorber is in operation.

6. The shock absorber piston as described in claim 5 in which the said first and second flow control disc valves are adapted to adjustment independently of each other while the shock absorber is in operation.